CHARLES H. WOLCOTT.
Thread-Cutter.

No. 126,860. Patented May 14, 1872.

Witnesses:
Franck D. Durand.
C. L. Evert.

Inventor
Chas. H. Wolcott.
per
Alexander Mason
Attorneys.

No. 126,860

UNITED STATES PATENT OFFICE.

CHARLES H. WOLCOTT, OF JAMESTOWN, NEW YORK.

IMPROVEMENT IN THREAD-CUTTERS FOR SEWING-MACHINES.

Specification forming part of Letters Patent No. 126,860, dated May 14, 1872.

*To all whom it may concern:*

Be it known that I, CHARLES H. WOLCOTT, of Jamestown, in the county of Chautauqua and in the State of New York, have invented certain new and useful Improvements in Thread-Cutter for Sewing-Machines; and do hereby declare that the following is a full, clear, and exact description thereof, reference being had to the accompanying drawing and to the letters of reference marked thereon making a part of this specification.

The nature of my invention consists in the construction and arrangement of a "thread-cutter for sewing-machines," as will be hereinafter more fully set forth.

In order to enable others skilled in the art to which my invention appertains to make and use the same, I will now proceed to describe its construction and operation, referring to the annexed drawing, in which—

Figure 1:
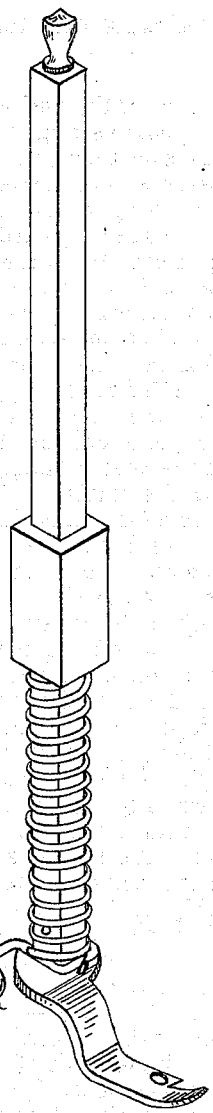
Figure 2:
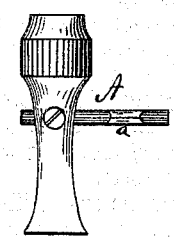
Figure 3:
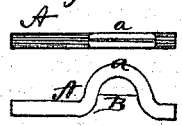
Figure 4:
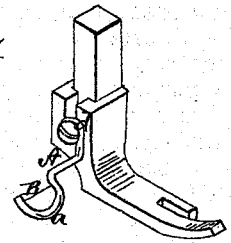

Figure 1 is a perspective view of the presser-foot and bar of a Grover & Baker machine with my thread-cutter attached. Fig. 2 represents the presser-foot of a Weed machine with the cutter attached. Fig. 3 shows the cutter, and Fig. 4 represents the presser-foot of a Singer machine with the cutter attached.

My thread-cutter is made simply of a piece of wire, A, bent or formed in the proper shape, as shown, with a bend or bow, *a*, and this bend or bow is slit open for the insertion of a small knife, B, after which the two parts are pressed together, holding the knife sufficiently for the purposes desired. To make the knives B, I take a piece of steel ribbon, similar to a watch-spring, and sharpen one edge, and then cut them off one-fourth of an inch long, or whatever lengths they may be wanted.

For a Grover & Baker sewing-machine, or other machines, having a coil spring around the presser-foot bar and resting upon the presser-foot, as shown in Fig. 1, the wire A is made with an open loop or hook, *b*, on its inner end. The cutter is then attached by raising the coil spring and slipping the hook *b* underneath between that and the presser-foot.

For a Domestic, Weed, or other machine having a hole through the presser-foot for the attachment of the quilter, the inner end of the wire is made straight, as shown in Figs. 2 and 3. This is then put through the hole in the presser-foot and fastened by the set-screw.

For a Singer machine the inner end of the wire A has an upward-bent hook, *d*, which is slipped onto the screw which holds the presser-foot onto the bar, as shown in Fig. 4.

I do not want to confine myself to any particular mode of fastening the thread-cutter, as for different machines the mode of fastening may be different, only so that it is attached at or near the presser-foot, whereby its location is such as to cut the thread the right distance from the needle simply by pulling the thread across the cutter.

I am aware that thread-cutters for sewing-machines have been used before, and I do, therefore, not desire to be understood as claiming such a device broadly, my invention being merely in the construction of the cutter of a piece of wire bent, as shown, and this bend or bow slit open for the insertion of the knife. The inner end of the wire being then formed to adapt it for attachment to the kind of sewing-machine for which it is intended, substantially in the manner indicated above, there is no necessity of preparing any part of the sewing machine for the reception of the thread-cutter. It can be attached to the machine just as the machine is. It answers its purpose admirably, and can be manufactured at a very small cost.

Having thus fully described my invention, what I claim as new, and desire to secure by Letters Patent, is—

The within-described thread-cutter, made of the single piece of wire A, bent to form the bow *a*, and slotted, and having the knife B secured therein, all as and for the purpose herein set forth.

In testimony that I claim the foregoing I have hereunto set my hand this 16th day of February, 1872.

CHARLES H. WOLCOTT.

Witnesses:
WM. D. COONS,
M. L. BISSELL.